Dec. 9, 1958 J. W. DAVIS 2,863,621
VERTICAL AND HORIZONTAL FLIGHT AIRCRAFT
Filed April 12, 1957 6 Sheets-Sheet 1

INVENTOR.
JOHN W. DAVIS,
BY
McMorrow, Berman + Davidson
ATTORNEYS.

Dec. 9, 1958 J. W. DAVIS 2,863,621
VERTICAL AND HORIZONTAL FLIGHT AIRCRAFT
Filed April 12, 1957 6 Sheets-Sheet 4

INVENTOR.
JOHN W. DAVIS,
BY
McMorrow, Berman + Davidson
ATTORNEYS.

Dec. 9, 1958 J. W. DAVIS 2,863,621
VERTICAL AND HORIZONTAL FLIGHT AIRCRAFT
Filed April 12, 1957 6 Sheets-Sheet 5
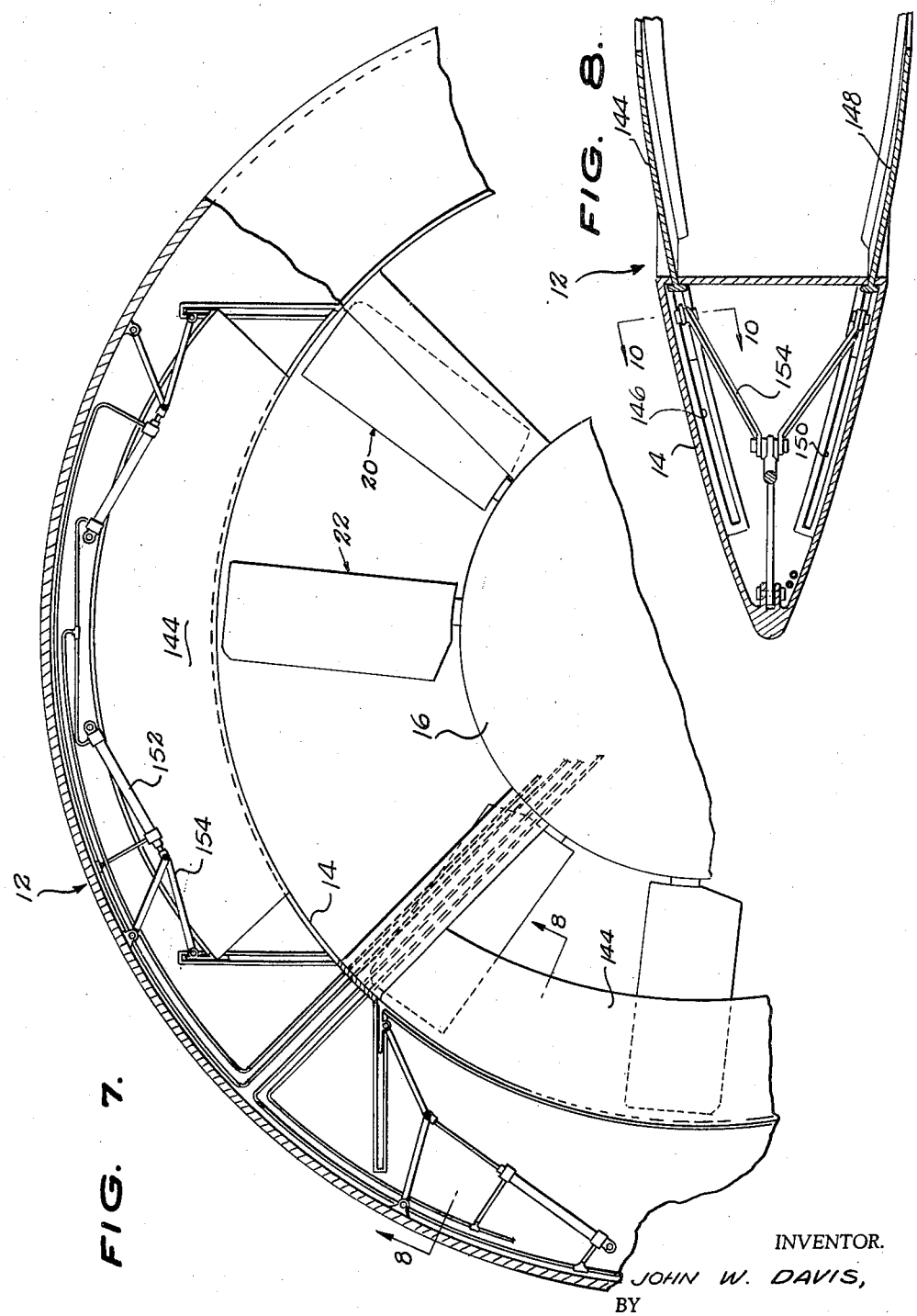
INVENTOR.
JOHN W. DAVIS,
BY
McMorrow, Berman + Davidson
ATTORNEYS.

United States Patent Office 2,863,621
Patented Dec. 9, 1958

2,863,621

VERTICAL AND HORIZONTAL FLIGHT AIRCRAFT

John W. Davis, El Paso, Tex.

Application April 12, 1957, Serial No. 652,552

5 Claims. (Cl. 244—23)

This invention relates to a vertical and horizontal flight aircraft.

An object of the present invention is to provide an aircraft which can quickly take off vertically and level off and attain a high rate of speed.

Another object of the present invention is to provide an aircraft which can hover and land in small areas.

A further object of the present invention is to provide an aircraft which is economical to fabricate and assemble, and one which is highly efficient in action.

These and other objects and advantages of the present invention will be fully apparent from the following description when taken in connection with the annexed drawings, in which.

Figure 1:
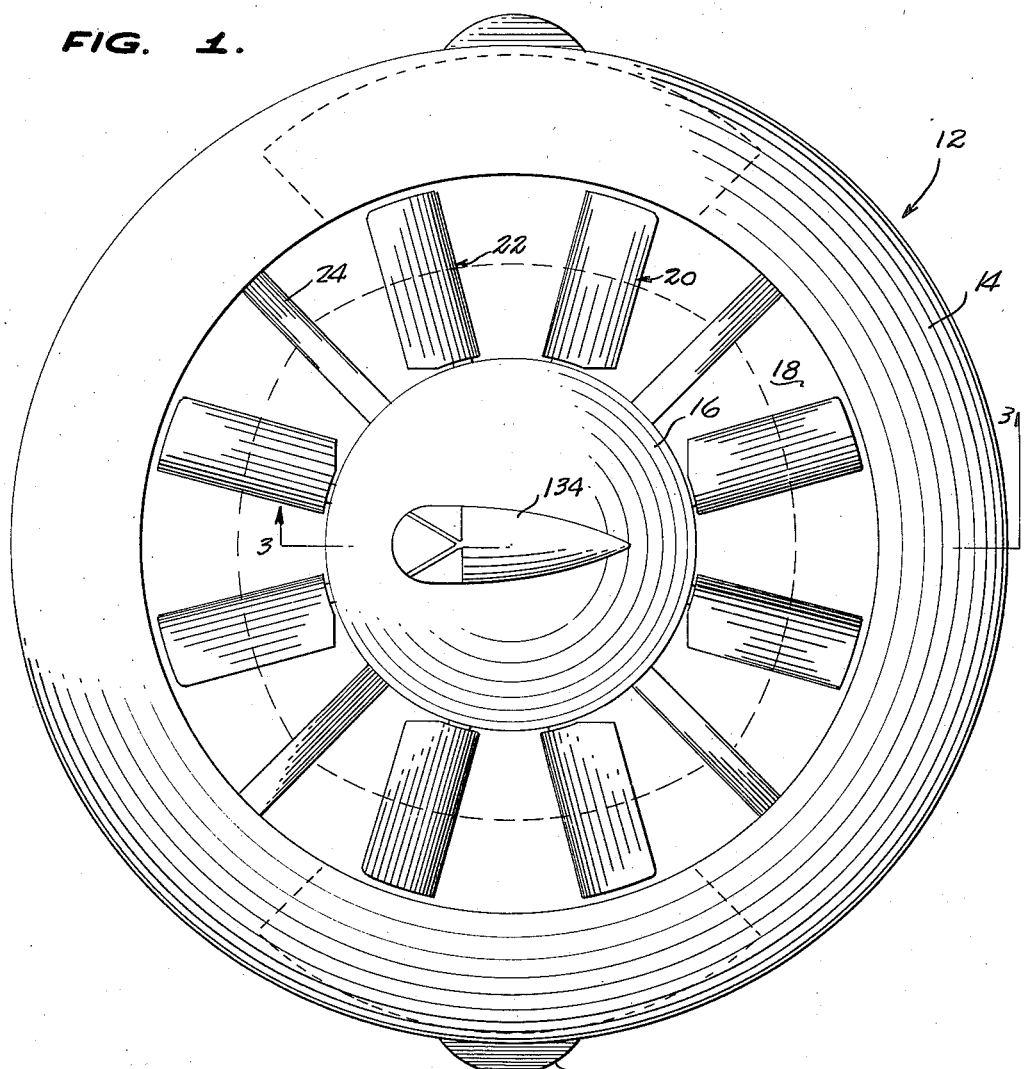
Figure 1 is a top plan view of the aircraft of the present invention.
Figure 2:
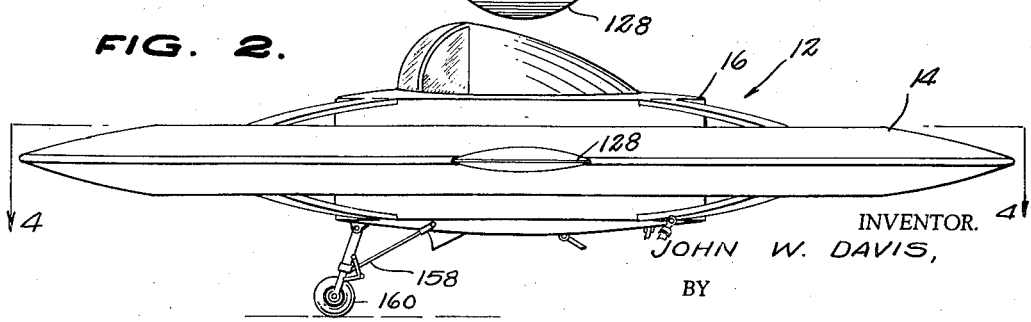
Figure 2 is a side elevational view.
Figure 3:
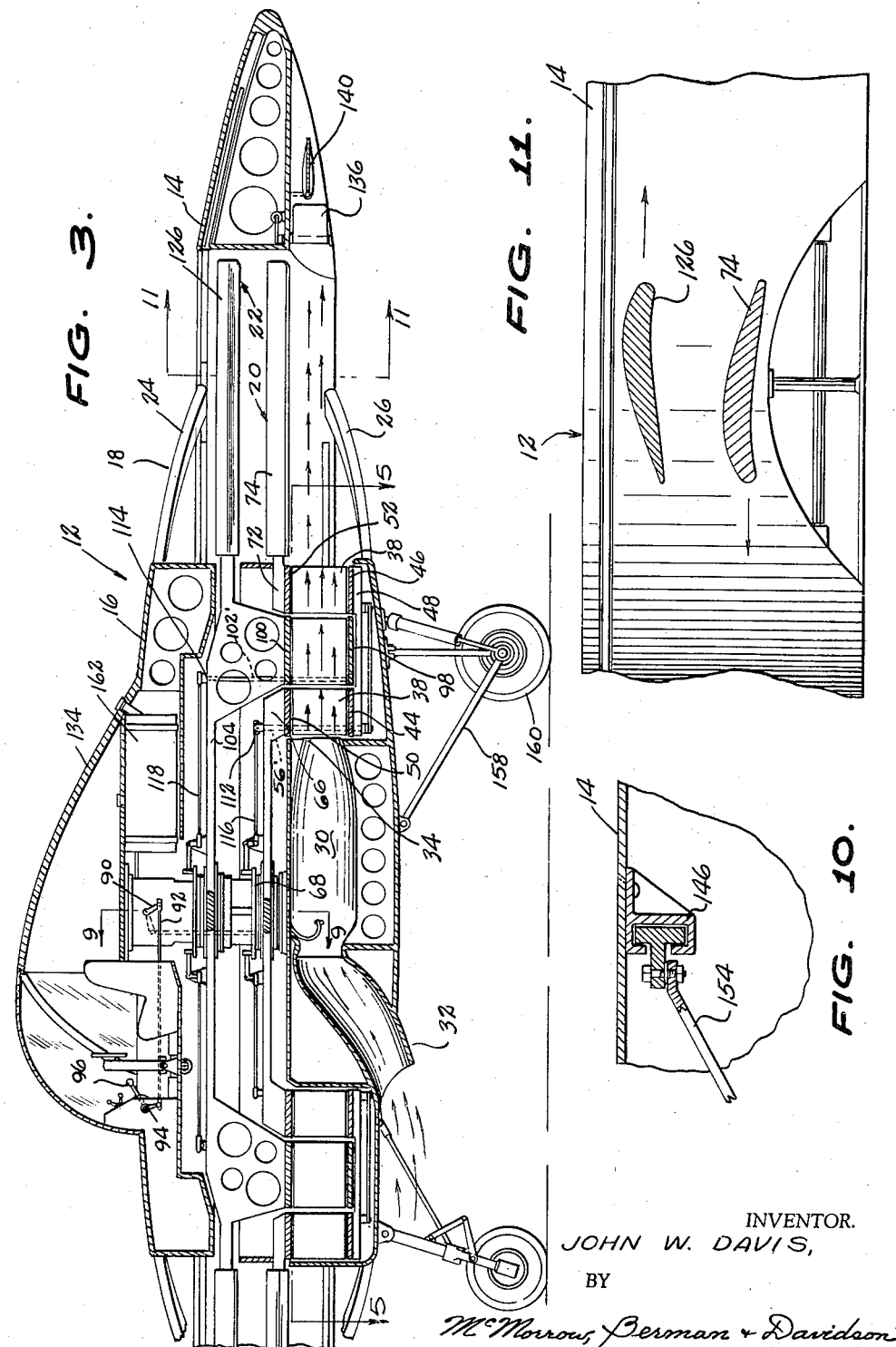
Figure 4:
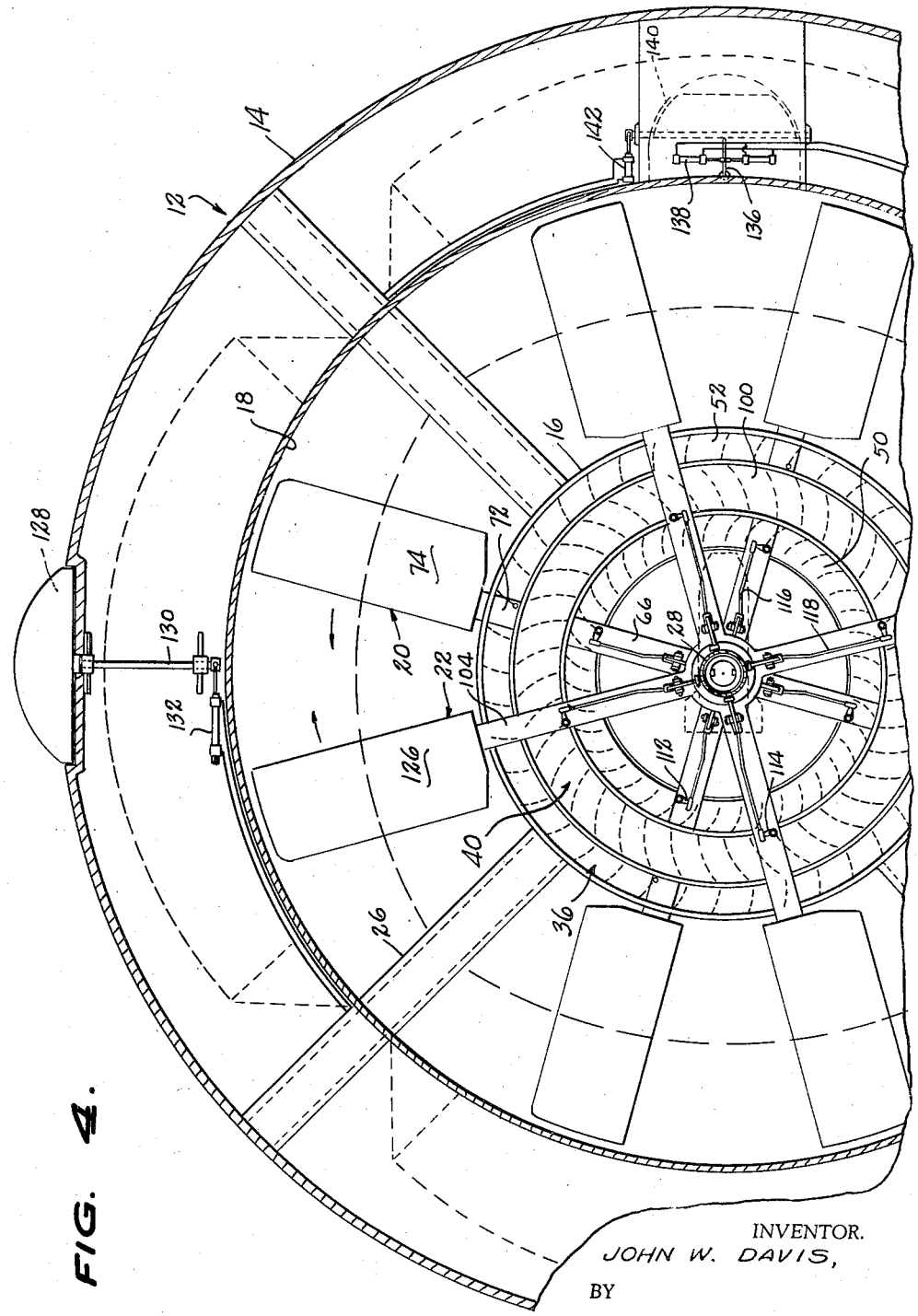
Figure 5:
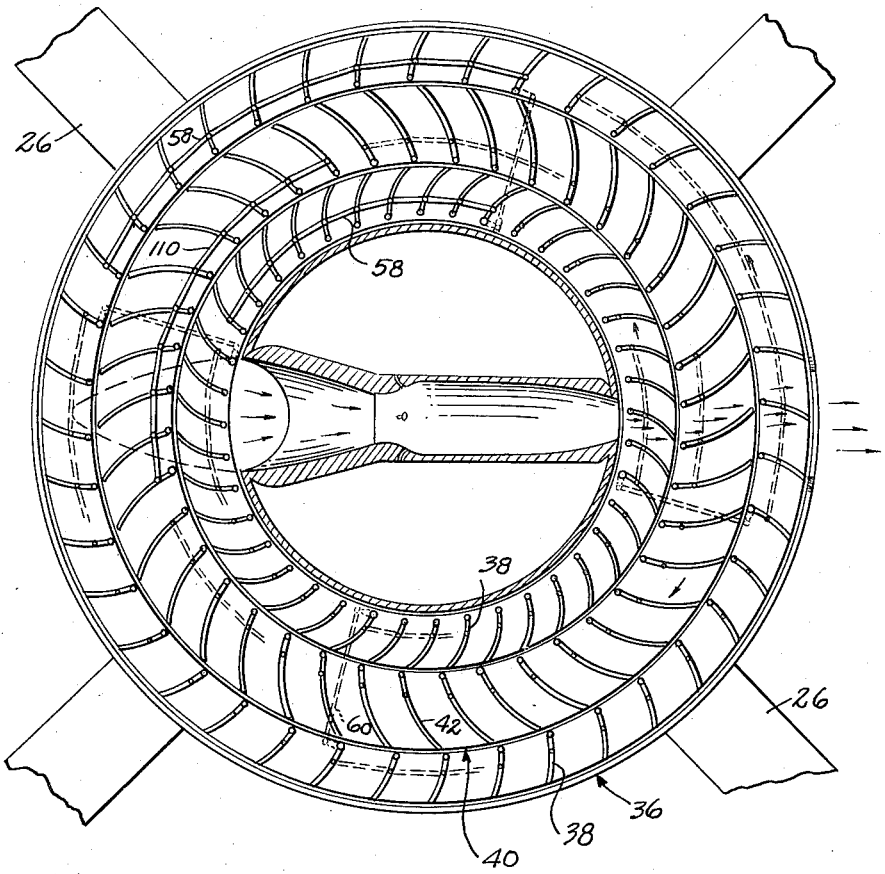
Figure 6:
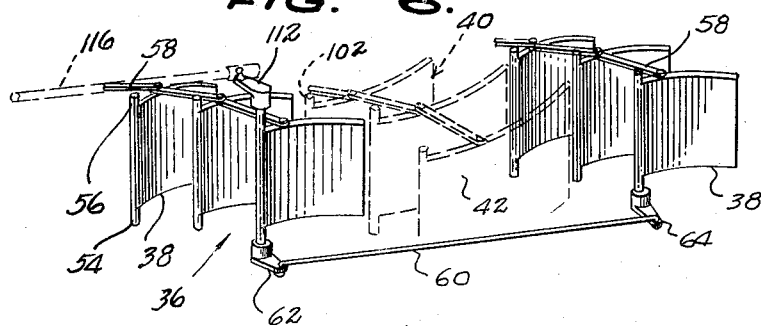
Figure 9:
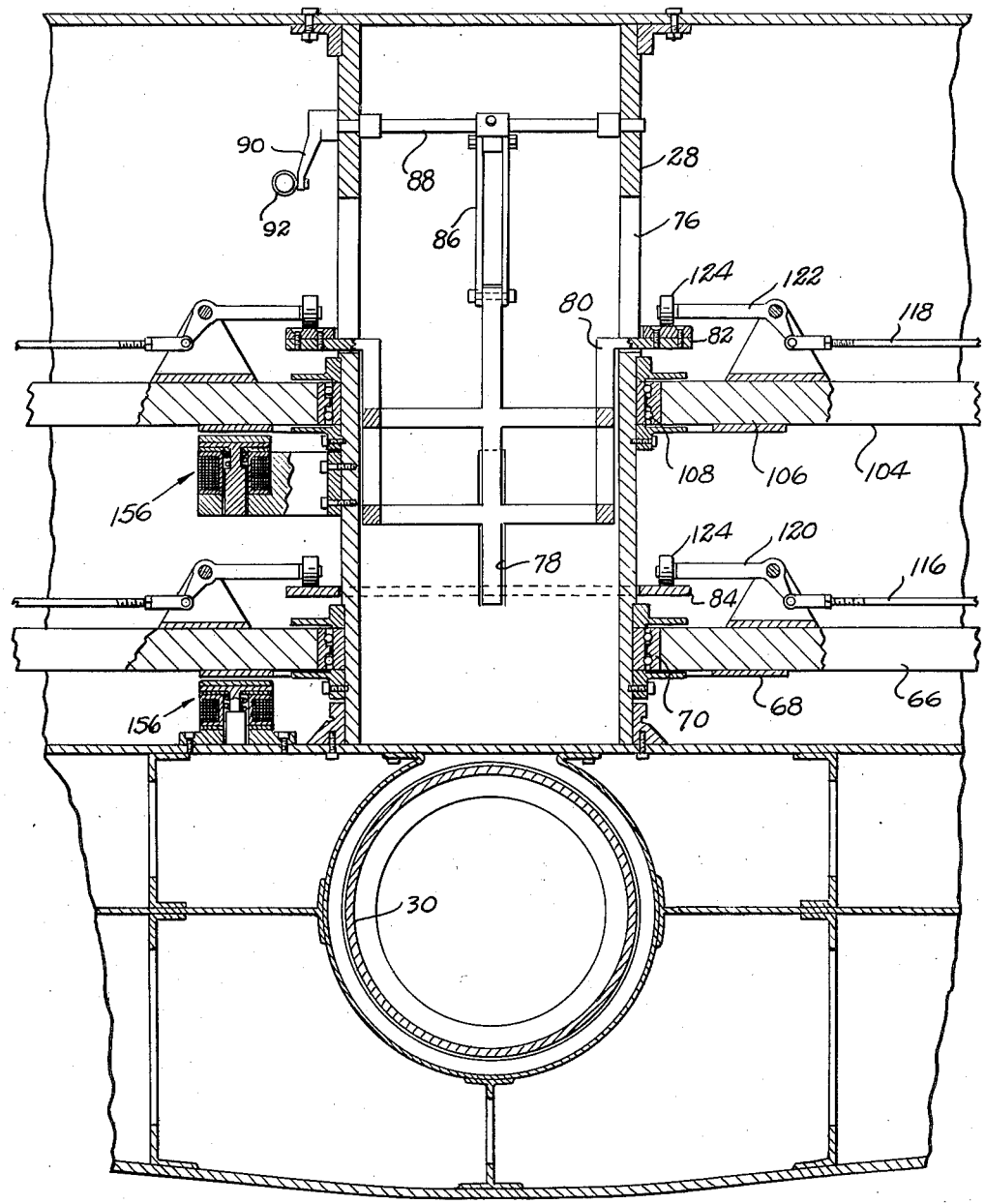

Figure 3 is a fragmentary sectional view, on an enlarged scale, taken on the line 3—3 of Figure 1, Figure 4 is a fragmentary sectional view, on an enlarged scale, taken on the line 4—4 of Figure 2, Figure 5 is a sectional view taken on the line 5—5 of Figure 3, Figure 6 is an isometric fragmentary view of the first turbine blade assembly shown in full lines with the second turbine blade assembly shown in dotted lines, Figure 7 is a fragmentary sectional view showing the means for partially closing the annular opening in the aircraft, Figure 8 is a sectional view, on an enlarged scale, taken on the line 8—8 of Figure 7, Figure 9 is a sectional view, on an enlarged scale, taken on the line 9—9 of Figure 3, Figure 10 is a sectional view, on an enlarged scale, taken on the line 10—10 of Figure 8, and Figure 11 is a sectional view, on an enlarged scale, taken on the line 11—11 of Figure 3.

Referring in greater detail to the drawings, in which like numerals indicate like parts throughout the several views, the aircraft according to the present invention is designated generally by the reference numeral 12 and comprises a horizontally disposed outer fuselage 14 and an inner fuselage 16 separated from each other by an annular opening 18 extending vertically through the aircraft 12. The aircraft 12 is disc shaped with its upper and lower surfaces shaped relative to each other, so as to present an airfoil in cross section.

A first propeller blade assembly 20 is positioned within the opening 18 so as to extend across and about the opening 18 and is connected to the inner fuselage 16 for rotational movement about a vertical axis in one direction. A second propeller blade assembly 22 is positioned within the opening 18 in superimposed spaced relation with respect to the assembly 20, and is also arranged to extend across and about the opening 18 and is connected to the inner fuselage 16 for rotational movement about the same vertical axis as the assembly 20. As indicated by the arrows in Figure 4, the second propeller blade assembly 22 rotates in the opposite direction to the direction of rotation of the first propeller blade assembly 20.

Upper and lower beams 24 and 26 respectively, connect the outer fuselage 14 and the inner fuselage 16 together and extend across the opening 18 at four equidistant points, as seen in Figure 1. Each of the propeller assemblies 20 and 22 are mounted upon a common hub 28 which is disposed vertically and centrally of the inner fuselage 16 and about which the propeller assemblies 20 and 22 rotate as a common vertical axis.

A reaction motor 30 of conventional construction having an intake scoop 32 projecting beneath the bottom surface of the inner fuselage 16 and having an exhaust nozzle 34, is positioned horizontally in the lower portion of the inner fuselage 16 inwardly of the opening 18 with the nozzle facing rearward.

Means is provided for effecting the rotation of the propeller assemblies 20 and 22 in opposite directions. Specifically, this means includes a first turbine blade assembly 36 embodying a pair of rows of spaced blades 38, the rows being arranged concentrically and spaced from each other. A second turbine blade assembly 40 consisting in spaced blades 42 arranged in a circular row, is positioned in the space between the pair of rows of the first turbine blade assembly 36. One of the rows of the first turbine blade assembly 36 is positioned so that the blades 38 thereof are exteriorly of and adjacent the nozzle 34 of the reaction motor 30 in the path of travel of the exhaust gases emerging from the motor 30. Means is provided connecting the first turbine blade assembly 36 to the first propeller assembly 20, and the second turbine blade assembly 40 to the second propeller assembly 22. Specifically, this means connecting the turbine blade assembly 36 to the propeller assembly 20 consists in a flat ring 44 positioned below and adjacent the blades 38 of the first row of the turbine blade assembly 36, and another flat ring 46 positioned below the blades 38 of the other row of the assembly 36. The rings 44 and 46 are connected together at intervals by bars 48, as shown in Figure 3.

Another flat ring 50 is arranged in superimposed spaced relation with respect to the flat ring 44 and a further flat ring 52 is similarly arranged with respect to the flat ring 46. Each of the blades 38 of the first turbine blade assembly 36 is provided at one end with lower and upper pivot pins 54 and 56 respectively, for mounting the blades 38 in the associated rings 44 and 50, and 46 and 52. The pivot pin mountings of the blades 38 permit the blades 38 to move from an operative position to an inoperative position in the path of travel of the exhaust gases emerging from the nozzle 34. Links 58 connect each of the blades 38 together for simultaneous movement and bars 60 attached to the free ends of crank arms 62 and 64 connect certain ones of the lower pivot pins 54 to complemental ones of the pivot pins 54 associated with the blades 38 of the other row of the assembly 36.

Referring to Figures 3 and 9, the flat ring 50 is seen to be carried upon the outer end of a support member 66 which is one arm of a spider having a hub 68 circumposed about the hub 28 with a bearing member 70 interposed therebetween. An arm 72 is carried by the flat ring 52 and supports a blade 74 of the first propeller assembly 20. The hub 28 is provided with slots 76 and 78 (Figure 9), through which extend bars 80 supporting a pair of circular trackways 82 and 84. The trackways 82 and 84 are shiftable upwardly and downwardly with respect to the hub 28 by means of linkage 86 connecting the bars 80 to a horizontally disposed shaft 88, a crank arm 90 connecting the shaft 88 to a control arm 92, and other crank arms 94 connecting a control rod 92 to an operating handle 96, as shown in Figure 3.

Other flat rings 98 and 100 are positioned below and above the blades 42 of the second turbine blade assembly 40. Other pivot pins 102 secure the blades 42 to the ring 100 and dependingly support the ring 98. Another support member 104 formed as a horizontally disposed arm of a spider having a hub 106 connects the flat ring 100 to the hub 106 for rotation about the hub 28 as a vertical axis. A bearing 108 is interposed between the hub 106 and the hub 28. Links 110 connect each of the blades 42 of the second turbine blade assembly 40 together for movement in unison about their pivot pins 102 as an axis for movement from the operative position to an inoperative position. Certain ones of the pivot pins 56' and 102' are extended, as seen in Figure 3, for attachment thereto of crank arms 112 and 114 respectively. Control rods 116 and 118 connect the crank arms 112 and 114, respectively, to levers 120 and 122 respectively, which carry rollers 124 on their free ends. The rollers 124 ride upon the upper surfaces of the trackways 82 and 84 and effect a shifting of the control rods 116 and 118 upon upward movement of the bars 80 in response to actuation of the handle 96.

A blade 126 is carried upon the free end of each of the support members 104 in superimposed spaced relation with respect to the blade 74 of the first propeller blade assembly 20. Control means for the aircraft 12 consists in an aileron 128 positioned on each side of the outer fuselage 14 and connected to the outer fuselage 14 for movement about a horizontal axis, such axis constituting a control shaft 130 actuable by means of a hydraulic cylinder assembly 132 and controlled from the cockpit 134 of the aircraft 12. A vertically extending rudder 136 is positioned in tandem spaced relation with respect to the exhaust 34 of the reaction motor 30, and is connected to the outer fuselage 14 for swinging movement about a vertical axis. Other hydraulic cylinder assemblies 138 actuated from the cockpit 134 control the movement of the rudder 136. An elevator 140 is positioned in tandem relation with respect to the rudder 136 and is similarly controlled by hydraulic cylinder assembly 142 for swinging movement about a horizontal axis. The rudder 136 and elevator 140 are cooperatively positioned with respect to the nozzle 34.

Means is provided for partially closing the upper end of the opening 18, so as to reduce resistance to travel through the air and turbulence of the air passing over the upper portion of the outer fuselage 14 and the inner fuselage 16 during level flight. Such means consists in a plurality of covers 144 having an end mounted in a trackway 146 carried on the inner wall of the outer fuselage 14. Similar covers 148 are carried on other trackways 150 and are shiftable, so as to partially close the lower end of the opening 18. Hydraulic cylinder assemblies 152 and appropriately arranged arms and levers 154 are used to shift the covers 144 from the retracted position to the extended position, as shown in Figure 7. Means is provided for slowing down one of the propeller assemblies relative to the speed of the other propeller assembly and comprises a solenoid operated brake assembly 156 associated with the under side of each of the hubs 68 and 106 and operable by conventional means (not shown), in the cockpit 134.

Suitable landing gear 158 having wheels 160 is provided on the under side of the aircraft 12 and is connected thereto for extensile and retractile movement in the conventional manner.

In operation, with the aircraft 12 carrying a load of appropriate fuel in its tank 162, the blades 38 and 42 of the first and second turbine blade assemblies 36 and 40 respectively, are turned to the position in which the gas is ejected from the exhaust nozzle 34 of the motor 30 and impinge upon the concave sides of such blades, and the motor 30 is started. The exhaust gases impinging upon the blades of the turbine assemblies causes the first and second propeller blade assemblies 20 and 22 to rotate in opposite directions and to impart to the aircraft 12 vertical motion. Slowing of one of the propeller assemblies 20 or 22 by means of the brake assembly 156 will cause the aircraft to turn about a vertical axis with the appropriate one of the ailerons 128 serving as a yaw control. Adjustment of the angle of the blades 38 and 42 will result in controlling the vertical flight of the aircraft 12 and enable the same to travel in horizontal flight with virtually no air driven downwardly through the opening 18. With the aircraft 12 in horizontal flight, the rudder 136 and the elevator 140 may be used together with the ailerons 128 to execute turns and to maintain the attitude of the aircraft 12 as desired.

What is claimed is:

1. In an aircraft, the combination with a horizontally disposed fuselage provided with an annular opening extending vertically therethrough, a first propeller assembly positioned within said opening so as to extend across and about said opening and connected to said fuselage for rotational movement about a vertical axis in one direction, a second propeller assembly positioned within said opening and spaced from said first propeller assembly and arranged so as to extend across and about said opening and connected to said fuselage for rotational movement about said vertical axis in an opposite direction, of a reaction motor having a nozzle for the ejection of exhaust gases therefrom positioned horizontally within said fuselage inwardly of said opening with the nozzle facing rearward, a turbine blade assembly positioned so that it is exteriorly of and adjacent said nozzle and connected to said fuselage for rotational movement about said vertical axis responsive to impingement of gases when ejected from said nozzle, and means operatively connecting said first and second propeller assemblies to said turbine blade assembly for rotation with the latter.

2. In an aircraft, the combination with a horizontally disposed fuselage provided with an annular opening extending vertically therethrough, a first propeller assembly positioned within said opening so as to extend across and about said opening and connected to said fuselage for rotational movement about a vertical axis in one direction, a second propeller assembly positioned within said opening and spaced from said first propeller assembly and arranged so as to extend across and about said opening and connected to said fuselage for rotational movement about said vertical axis in an opposite direction, of a reaction motor having a nozzle for the ejection of exhaust gases therefrom positioned horizontally within said fuselage inwardly of said opening with the nozzle facing rearward, a first turbine blade assembly positioned so that it is exteriorly of and adjacent said nozzle and connected to said fuselage for rotational movement about said vertical axis in said one direction responsive to the impingement of gases when ejected from said nozzle, a second turbine blade assembly positioned in concentric spaced relation with respect to said first turbine blade assembly and connected to said fuselage for rotational movement about said vertical axis in said another direction in response to impingement of gases when ejected from said nozzle, means operatively connecting said first propeller assembly to said first turbine blade assembly for rotation with said first turbine blade asembly, and means operatively connecting said second propeller assembly to said second turbine blade assembly for rotation with the latter.

3. In an aircraft, the combination with a horizontally disposed fuselage provided with an annular opening extending vertically therethrough, a first propeller assembly positioned within said opening so as to extend across and about said opening and connected to said fuselage for rotational movement about a vertical axis in one direction, a second propeller assembly positioned within said opening and spaced from said first propeller assembly and arranged so as to extend across and about said opening and connected to said fuselage for rotational movement about said vertical axis in an opposite direction, of a reaction motor having a nozzle for the ejection of exhaust gases therefrom positioned horizontally within said fuselage inwardly of said opening with the nozzle facing rearward, a turbine blade assembly positioned so that it is exteriorly of and adjacent said nozzle and connected to said fuselage for rotational movement about said vertical axis responsive to the impingement of gases when ejected from said nozzle, means operatively connecting said first and second propeller assemblies to said turbine blade assemblies for rotation with the latter, and an aileron positioned on each side of said fuselage and connected to said fuselage for movement about a horizontal axis.

4. In an aircraft, the combination with a horizontally disposed fuselage provided with an annular opening extending vertically therethrough, a first propeller assembly postioned within said opening so as to extend across and about said opening and connected to said fuselage for rotational movement about a vertical axis in one direction, a second propeller assembly positioned within said opening and spaced from said first propeller assembly and arranged so as to extend across and about said opening and connected to said fuselage for rotational movement about said vertical axis in an opposite direction, of a reaction motor having a nozzle for the ejection of exhaust gases therefrom positioned horizontally within said fuselage inwardly of said opening with the nozzle facing rearward, a first turbine blade assembly embodying a pair of annularly arranged rows of blades positioned so that one row of said pair is exteriorly of and adjacent said nozzle and the other row of said pair is circumposed about and spaced from said one row, said one and other rows of blades being connected to said fuselage for rotational movement as a unit about said vertical axis in one direction responsive to the impingement of gases when ejected from said nozzle, a second turbine blade assembly positioned in the space between said rows of blades of said first turbine blade assembly and connected to said fuselage for rotational movement about said vertical axis in said other direction in response to the impingement of gases when ejected from said nozzle, means operatively connecting said first propeller assembly to said one and other rows of blades for rotation with said one and other rows of blades, and means operatively connecting said second propeller assembly to said second turbine blade assembly for rotation with the latter.

5. In an aircraft, the combination with a horizontally disposed fuselage provided with an annular opening extending vertically therethrough, a first propeller assembly positioned within said opening so as to extend across and about said opening and connected to said fuselage for rotational movement about a vertical axis in one direction, a second propeller assembly positioned within said opening and spaced from said first propeller assembly and arranged so as to extend across and about said opening and connected to said fuselage for rotational movement about said vertical axis in an opposite direction, of a reaction motor having a nozzle for the ejection of exhaust gases therefrom positioned horizontally within said fuselage inwardly of said opening with the nozzle facing rearward, a first turbine blade assembly embodying a pair of annularly arranged rows of blades positioned so that one row of said pair is exteriorly of and adjacent said nozzle and the other row of said pair is circumposed about and spaced from said one row, said one and other rows of blades being connected to said fuselage for rotational movement as a unit about said vertical axis in one direction responsive to the impingement of gases when ejected from said nozzle, a second turbine blade assembly positioned between said one and other rows of blades of said first turbine blade assembly and connected to said fuselage for rotational movement about said vertical axis in said other direction in response to the impingement of gases when ejected from said nozzle, means operatively connecting said first propeller assembly to said one and other rows of blades for rotation with said one and other rows of blades, means operatively connecting said second propeller assembly to said second turbine blade assembly for rotation with the latter, hand actuable means connecting the blades of said first and second turbine blade assemblies together for movement from an operative position to an inoperative position, an aileron positioned on each side of said fuselage and being connected to said fuselage for movement about a horizontal axis, and rudder and elevator control means cooperatively positioned with respect to said nozzle and connected to said fuselage for movement relative to the latter.

References Cited in the file of this patent

UNITED STATES PATENTS

| | | |
|---|---|---|
| 1,824,195 | Chillingworth | Sept. 22, 1931 |
| 2,377,835 | Weygers | June 5, 1945 |

FOREIGN PATENTS

| | | |
|---|---|---|
| 1,068,404 | France | Feb. 3, 1954 |